United States Patent [19]
Danilychev

[11] Patent Number: 5,931,557
[45] Date of Patent: *Aug. 3, 1999

[54] ENERGY EFFICIENT ULTRAVIOLET VISIBLE LIGHT SOURCE

[76] Inventor: Vladimir A. Danilychev, 4501 Pinyon Tree La., Irvine, Calif. 92715

[ * ] Notice: This patent is subject to a terminal disclaimer.

[21] Appl. No.: 08/922,949

[22] Filed: Sep. 3, 1997

Related U.S. Application Data

[63] Continuation-in-part of application No. 08/626,470, Apr. 2, 1996, Pat. No. 5,666,640.

[51] Int. Cl.$^6$ ...................................................... B01J 19/12
[52] U.S. Cl. .............................. 362/92; 362/234; 362/96; 422/186.1; 422/186.11
[58] Field of Search ........................... 422/186.07, 186.1, 422/186.11; 362/96, 234, 225, 260, 92

[56] References Cited

U.S. PATENT DOCUMENTS

| | | |
|---|---|---|
| 3,872,349 | 3/1975 | Spero et al. . |
| 3,911,318 | 10/1975 | Spero et al. . |
| 3,983,039 | 9/1976 | Eastland . |
| 4,042,850 | 8/1977 | Ury et al. . |
| 4,208,587 | 6/1980 | Eastland et al. . |
| 4,269,581 | 5/1981 | Ury et al. . |
| 4,313,969 | 2/1982 | Matthews et al. . |
| 4,359,668 | 11/1982 | Ury . |
| 5,039,918 | 8/1991 | Ohtake ..................................... 315/248 |
| 5,503,807 | 4/1996 | Griffiths et al. ................... 422/186.04 |

*Primary Examiner*—Sandra O'Shea
*Assistant Examiner*—Marshall Honeyman
*Attorney, Agent, or Firm*—Stetina Brunda Garred & Brucker

[57] ABSTRACT

A microwave powered ultraviolet and/or visible light producing system comprising a housing defining a microwave cavity having a volume Vo, an inlet and exhaust ports which communicate with the microwave cavity. Disposed within the microwave cavity and uniformly distributed therewithin are a number N of ultraviolet and/or visible light producing lamps, each of which has an inner diameter D, a length L, and a nominal power p. Communicating with the microwave cavity is a microwave magnetron generator having a microwave power P and producing microwaves having a wavelength $\lambda$. Electrically connected to the generator is a power supply. The optimal operating condition for the system to maximize the ultraviolet and/or visible light output and longevity of the lamps and minimize system power consumption is governed by the relationships:

$Vo \geq V$ min 1 wherein $V$ min $1 = 8 \pi \lambda^3/3$;

$Vo \geq V$ min 2 wherein $V$ min $2 = \pi(D+1)^2 N L/4$;

and $$P = kNp\sqrt{1 + Vo/Vmin}$$

wherein V min is the larger of V min 1 and V min 2, and k is a constant with a value in the range of $0.3 \leq k \leq 3$, and $\pi = 3.14$.

43 Claims, 4 Drawing Sheets

ENERGY EFFICIENT ULTRAVIOLET VISIBLE LIGHT SOURCE

RELATED APPLICATIONS

The present application is a continuation-in-part of U.S. application Ser. No. 08/626,470 entitled MICROWAVE POWERED OZONE PRODUCING SYSTEM filed Apr. 2, 1996, now U.S. Pat. No. 5,666,640, the disclosure of which is incorporated herein by reference.

FIELD OF THE INVENTION

The present invention relates generally to ultraviolet and visible light sources, and more particularly to devices adapted to provide highly energy efficient sources of ultraviolet and/or visible radiation for use in a wide variety of applications, including but not limited to the photopolymerization of liquid and solid polymers in the optical, semiconductor, electronic and medical industries, surface cleaning and etching, sterilization, exposing light sensitive materials, and illumination.

BACKGROUND OF THE INVENTION

Ultraviolet and visible radiation is being increasingly used for a wide variety of applications in different industries. For example, ultraviolet radiation is used for the photopolymerization of liquid and solid polymers in the optical, semiconductor, electronic, and medical industries, and is also used for the cleaning and etching of semi-conductors, metals and plastics, surface cleaning and etching, sterilization, exposing light sensitive materials, and illumination. In the chemical industry, ultraviolet radiation is used for, among other things, inducing reactions in gases, liquids and emulsions. Other commercial applications for ultraviolet radiation include the use thereof in relation to the photoexposure of films, photopaper, and photosensitive emulsions and materials. Ultraviolet radiation, alone or in combination with ozone, is also used for sterilization applications.

Prior art systems for generating ultraviolet or visible radiation typically comprise low-pressure mercury or fluorescent lamps which are powered with AC voltage through common fluorescent ballasts. These prior art radiation generating systems possess certain deficiencies which detract from their overall utility. Such deficiencies include the very large size and weight of the system due to the need to include a separate ballast for each lamp, and the high power consumption associated with the inclusion of many ballasts. Thus, although ultraviolet radiation can be used in numerous applications as described above, the prior art systems for generating ultraviolet radiation are highly inefficient, and costly to manufacture as well as to operate.

It has been determined in the prior art that the efficiency of excitation of electric discharge in a gas filled lamp can be increased up to two times by replacing the AC or DC excitation with microwave excitation. In addition to increasing discharge efficiency, the use of microwave excitation also eliminates the need for the ballasts to power each of the individual lamps. The use of microwave powered efficient, medium pressure mercury lamps is disclosed in U.S. Pat. Nos. 3,872,349, 3,911,318, and 4,042,850. In these particular references, microwave cavities are used in conjunction with microwave powered ultraviolet light sources. However, the microwave cavities disclosed in these references operate on fundamental or near fundamental cavity modes. These types of mode structures make it impossible to simultaneously excite a large number of lamps uniformly due to the inclusion of very clearly defined, non-homogeneous standing wave electric field distribution inside the microwave cavity. Though the multi-mode cavities widely used in conventional microwave ovens provide homogeneous electric field distribution inside the cavity, they do not provide the critical optimal electric field strength absolutely necessary for the efficient excitation of mercury, fluorescent or other types of gas discharge lamps for the efficient generation of ultraviolet radiation and/or visible radiation.

The present invention overcomes the deficiencies associated with the prior art by defining the critical conditions which interrelate the geometry of the microwave cavity, the individual lamp dimensions, the microwave cavity volume, and the microwave power of the magnetron generator for the efficient, homogeneous excitation in the same microwave cavity of from one to thousands of ultraviolet and/or visible light producing lamps for the production of ultraviolet and/or visible radiation. In the present invention, ultraviolet and/or visible radiation is generated with up to two times less energy consumption than prior art AC/DC mercury or other gas discharge lamp ultraviolet and/or visible radiation generators including the same number of lamps. In this respect, the present invention provides a powerful, compact, low-cost and reliable ultraviolet and/or visible radiation generator for the production of ultraviolet and/or visible radiation using standard, low-pressure mercury lamps or other types of UV or visible light producing lamps.

SUMMARY OF THE INVENTION

In accordance with a first, basic embodiment of the present invention, there is provided a microwave powered ultraviolet and/or visible radiation producing apparatus. The apparatus comprises a housing which defines a microwave cavity having a volume Vo. Disposed within the microwave cavity are a number N of light producing lamps, each of which has a diameter D, a length L, and a nominal power p. Additionally, communicating with the microwave cavity is a microwave magnetron generator having a microwave power P and producing microwaves having a wavelength λ. Electrically connected to the generator is a power supply. In the first embodiment, the optimal operating condition for the apparatus to maximize the ultraviolet output and longevity of the lamps and minimize system power consumption is governed by the relationships:

$Vo \geq V \min 1$ wherein $V \min 1 = 8\pi\lambda^3/3$ [formula (1)]

$Vo \geq V \min 2$ wherein $V \min 2 = \pi(D+1)^2 N L/4$ [formula (2)]

$P = kNp\sqrt{1 + Vo/Vmin}$ [formula (3)]

wherein V min is the larger of V min 1 and V min 2, and k is a constant with a value in the range of $0.3 \leq k \leq 3$ (low values of k are used in the case of extended lamp life time, while high values of k are used in the case of highest power and radiation production rate). In formulas (1), (2), and (3), the units for λ, D, and L are in cm; the units for Vo, V min, V min 1, and V min 2 are in cm$^3$; the units for P and p are in watts; and π=3.14.

The microwave cavity of the apparatus constructed in accordance with the first embodiment is defined by a top wall of the housing, a bottom wall of the housing which is disposed in spaced relation to the top wall, and a side wall of the housing which extends between the top and bottom walls. The housing preferably includes inlet and exhaust ports which each communicate with the microwave cavity and are used to facilitate the circulation of a fluid (e.g., air) therethrough. The inlet and exhaust ports are each preferably covered by a sheet of metal mesh to prevent the escape of microwaves from within the microwave cavity. The microwave magnetron generator may communicate with the microwave cavity via a waveguide. The top, bottom and sidewalls of the housing are each preferably fabricated from sheet metal formed of steel, stainless steel, aluminum, tungsten, or nickel. The microwave cavity has a maximum cross-sectional dimension d which is greater than $\lambda/2$ for allowing microwaves to enter therein. One or more walls of the microwave cavity are preferably detachable (i.e., comprise a door) in order to provide access to the interior of the microwave cavity for purposes of inserting objects thereinto and removing objects therefrom.

The light producing lamps of the first embodiment are preferably included in a light panel which is disposed within the microwave cavity. The light panel comprises a peripheral frame member which defines at least one pair of opposed sides and is preferably fabricated from a material selected from the group consisting of metal, ceramic and plastic. The lamps are arranged within the frame member so as to extend between the opposed sides thereof in substantially parallel relation to each other. Attached to the frame member in spaced relation to the lamps is a reflector member which may be fabricated from a metal material selected from the group consisting of stainless steel and aluminum, or may alternatively be fabricated from a dielectric material such as dichroic glass or glass with a dichroic coating. The reflector member defines a peripheral edge which is spaced a distance d1 from the sidewall of the housing partially defining the microwave cavity, with the reflector member being sized relative to the microwave cavity walls such that $d1 \geq \frac{1}{8}\lambda$.

In accordance with a second embodiment of the present invention, there is provided an ultraviolet and/or visible radiation generating apparatus which is similarly configured to the first embodiment, except that at least one wall of the housing in the second embodiment, such as the bottom wall, comprises a sheet of metal mesh rather than being fabricated from a sheet metal material. As is known, microwaves will not pass through a metal mesh material.

In accordance with a third embodiment of the present invention, the housing is provided with an elongate channel which extends through the microwave cavity. The channel has opposed open ends, and is defined by a metal mesh. In this respect, the sidewall of the housing includes an opposed pair of longitudinal and lateral sidewall portions, with the channel being spaced from the longitudinal sidewall portions by a distance d3 and the open ends thereof communicating with respective ones of the lateral sidewall portions. The channel is sized relative to the microwave cavity longitudinal walls such that $d3 \geq \frac{1}{8}\lambda$.

In the third embodiment, the lamps are included in a first light panel which is disposed within the microwave cavity between the channel and the top wall of the housing, and a second light panel which is disposed within the microwave cavity between the channel and the bottom wall of the housing. Similar to the first embodiment, the first and second light panels each comprise a peripheral frame member defining at least one pair of opposed sides, with the lamps being arranged within each of the frame members so as to extend between the opposed sides thereof in substantially parallel relation to each other. The first and second light panels each further comprise a reflector member attached to the frame member in spaced relation to the lamps therein for concentrating the output of the lamps toward the channel.

In accordance with a fourth embodiment of the present invention, the housing is configured such that the microwave cavity includes first and second sections, each of which is defined by an outer wall and an inner wall fabricated from a metal mesh. In addition to the first and second sections, the microwave cavity includes a third section which is disposed between the first and second sections and is defined by opposed sidewalls fabricated from a metal mesh. The first, second and third sections of the microwave cavity have a combined volume Vo. The housing includes a first channel partially defined by the inner wall of the first section and one sidewall of the third section, and a second channel which is partially defined by the inner wall of the second section and one sidewall of the third section.

In the fourth embodiment, the lamps are included in first and second light panels which are disposed within respective ones of the first and second sections of the microwave cavity between the inner and outer walls thereof, and a third light panel which is disposed within the third section of the microwave cavity between the opposed sidewalls thereof. The first, second and third light panels each accommodate the number $\frac{1}{3}(N)$ of lamps and comprise a peripheral frame member defining at least one pair of opposed sides, with the lamps being arranged within each of the frame members so as to extend between the opposed sides thereof in substantially parallel relation to each other. The first and second light panels each further comprise a reflector member which is attached to the frame member in spaced relation to the lamps therein for concentrating the output of the lamps toward respective ones of the first and second channels.

In accordance with a fifth embodiment of the present invention, the microwave cavity is defined by a top wall of the housing which defines the top end thereof, a sheet of metal mesh which is disposed within the housing, and a sidewall portion of the housing which extends between the top wall and the sheet of metal mesh. In the fifth embodiment, the lamps are included in a light panel which is disposed within the microwave cavity and comprises a peripheral frame member defining at least one pair of opposed sides. The lamps are arranged within the frame member so as to extend between the opposed sides thereof in substantially parallel relation to each other. The light panel further comprises a reflector member which is attached to the frame member in spaced relation to the lamps for concentrating the output of the lamps toward the sheet of metal mesh.

In the fifth embodiment, the housing has a depth D and a width W. The light panel is preferably spaced from the bottom end of the housing by a distance L, with the sheet of metal mesh having a thickness t and being spaced from the bottom end of the housing by a distance H. The housing is preferably sized such that $L \geq D$, $L \geq W$, and $H \geq 20(t)$. The optimal position of a target for uniform exposure to radiation in the fifth embodiment is at the bottom end of the housing. Sizing the housing in accordance with the foregoing formulas provides for the uniform distribution of radiation therefrom and protects against the formation of shadows from the mesh on any parts which are to be treated with radiation generated from the light producing lamps.

In accordance with a sixth embodiment of the present invention, the microwave cavity is defined by a top wall of the housing which defines the top end thereof, a plurality of light pipes which are disposed within the housing, and sidewall portion of the housing which extends between the top wall and the light pipes. In the sixth embodiment, each of the light pipes is preferably fabricated from a reflective metal material, and has a maximum cross-sectional dimension d4 and a length h, with the light pipes being sized such that $d4 \leq \lambda/2$, and $h \geq 5(d4)$. The optimal position for a target for uniform exposure to radiation in the sixth embodiment is at a distance of approximately 10(d4) below the bottom end of the housing. In the sixth embodiment, the light producing lamps are included in a light panel which is disposed within the microwave cavity and, as in previous embodiments, comprises a peripheral frame member defining at least one pair of opposed sides. The lamps are arranged within the frame members so as to extend between the opposed sides thereof in substantially parallel relation to each other, with the light panel further comprising a reflector member attached to the frame member in spaced relation to the lamps for concentrating the output of the lamps toward the light pipes.

In accordance with a seventh embodiment of the present invention, the lamps are included in a cylindrically configured light panel which is disposed within the microwave cavity and comprises an annular top support ring and an annular bottom support ring disposed in spaced relation to and coaxially aligned with the top support ring. Extending between and interconnecting the top and bottom support rings is at least one elongate spacer rod. Disposed within the microwave cavity is a sheet of metal mesh which defines a cylindrically configured chamber. The lamps extend between the top and bottom support rings about the sheet of metal mesh and outside of the chamber defined thereby. The lamps preferably extend linearly between the top and bottom support rings in generally parallel relation to each other, but may alternatively have circular or generally U-shaped configurations.

The housing of the seventh embodiment includes an opening disposed within the top wall thereof which allows parts or materials to be inserted into the metal mesh chamber. The light panel is supported within the microwave cavity such that the top support ring is substantially flush with the top wall, and the bottom support ring is spaced from the bottom wall of the housing by a distance d2. The light panel is sized relative to the microwave cavity such that $d2 \geq \frac{1}{8}\lambda$. The top and bottom support rings of the cylindrically configured light panel, as well as the at least one spacer rod, are each preferably fabricated from a material selected from the group consisting of metal, ceramic and plastic.

It is contemplated herein that the ultraviolet and/or visible radiation generating apparatus of any embodiment can include multiple microwave cavities interconnected by one or more waveguides, and may also include multiple microwave magnetron generators in communication with one or more microwave cavities.

Further in accordance with the present invention, certain embodiments as described above may be used in combination with a parts tray which is insertable into the microwave cavity. The parts tray comprises a bottom panel having a side panel extending upwardly therefrom. Removably attached to the side panel is a UV transparent window, with the bottom and side panels and window collectively defining an enclosed interior compartment of the tray. The bottom and side panels of the tray are each preferably fabricated from a material selected from the group consisting of metal, ceramic and plastic, with the window preferably being fabricated from a material selected from the group consisting of sapphire, quartz, glass and plastic transparent to ultraviolet light. The parts tray may alternatively comprise a metal bottom panel having a metal side panel extending upwardly therefrom. Attached to the side panel is a sheet of metal mesh, with the bottom and side panels and the sheet of metal mesh collectively defining a holding compartment of the tray.

The lamps included in the light panels of each of the above-described embodiments of the present invention are preferably selected from the group consisting of ozone producing mercury lamps, ozone free mercury lamps, black light mercury lamps including an internal phosphorus coating, metal halide lamps, excimer lamps, fluorescent lamps, hydrogen or deuterium lamps, and low pressure and medium pressure gas filled lamps.

Further in accordance with the present invention, there is provided a method of producing ultraviolet and/or visible radiation which comprises the initial step of providing a housing which defines a microwave cavity having a volume Vo. Thereafter, a number N of light producing lamps are disposed within the microwave cavity, with each of the lamps having a diameter D, a length L, and a nominal power p. A microwave magnetron generator is then placed into communication with the microwave cavity, with the generator having a microwave power P and producing microwaves having a wavelength $\lambda$.

The preferred method further includes the step of maximizing the output and longevity of the lamps and minimizing system power consumption by selecting the dimensions and functional attributes of the microwave cavity, the lamps, and the generator in accordance with the relationships:

$Vo \geq V$ min 1 wherein $V$ min $1 = 8\pi\lambda^3/3$ [formula (1)]

$Vo \geq V$ min 2 wherein $V$ min $2 = \pi(D+1)^2 N L/4$ [formula (2)]

$$P = kNp\sqrt{1 + Vo/Vmin}$$ [formula(3)]

wherein V min is the larger of V min 1 and V min 2, k is a constant with a value in the range of $0.3 \leq k \leq 3$, and $\pi = 3.14$.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
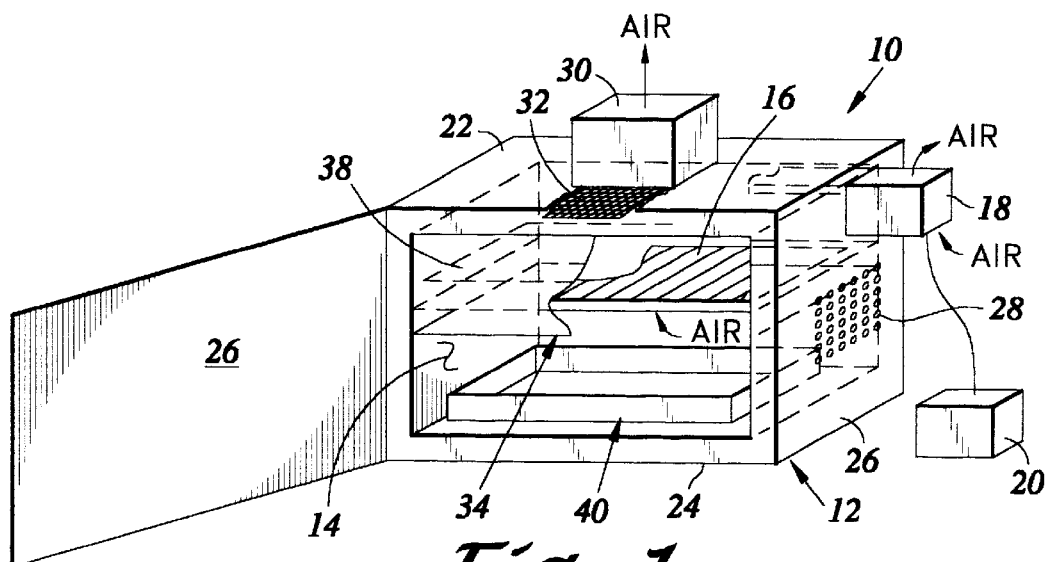
FIG. 1 is a perspective view of a radiation generating apparatus constructed in accordance with a first embodiment of the present invention.

Referring now to the drawings wherein the showings are for purposes of illustrating preferred embodiments of the present invention only, and not for purposes of limiting the same, FIG. 1 perspectively illustrates an ultraviolet and/or visible radiation generating apparatus 10 constructed in accordance with a first embodiment of the present invention. The apparatus 10 comprises a housing 12 which defines a microwave cavity 14 having a volume Vo. Disposed within the microwave cavity 14 are a number N of ultraviolet and/or visible radiation producing lamps 16, each of which has a diameter D, a length L, and a nominal power p. Additionally, communicating with the microwave cavity 14 is a microwave magnetron generator 18 having a microwave power P and producing microwaves having a wavelength $\lambda$. Electrically connected to the generator 18 is a power supply 20.

In the first embodiment, the optimal operating condition for the apparatus 10 to maximize the output and longevity of the lamps 16 and minimize system power consumption is governed by the relationships:

$Vo \geq V \min 1$ wherein $V \min 1 = 8 \pi \lambda^3 / 3$  [formula (1)]

$Vo \geq V \min 2$ wherein $V \min 2 = \pi (D+1)^2 N L / 4$  [formula (2)]

$$P = kNp\sqrt{1 + Vo/Vmin}$$  [formula(3)]

wherein V min is the larger of V min 1 and V min 2, and k is a constant with a value in the range of $0.3 \leq k \leq 3$ (low values of k are used in the case of extended lamp life time, while high values of k are used in the case of highest power and radiation production rate). In formulas (1), (2), and (3), the units for $\lambda$, D, and L are in cm; the units for Vo, V min, V min 1, and V min 2 are in cm$^3$; the units for P and p are in watts; and $\pi = 3.14$.

The microwave cavity 14 of the apparatus 10 constructed in accordance with the first embodiment is defined by a top wall 22 of the housing 12, a bottom wall 24 of the housing 12 which is disposed in spaced relation to the top wall 22, and sidewalls 26 of the housing 12 which extend between the top and bottom walls 22, 24 thereof. As seen in FIG. 1, one of the sidewalls 26 is detachable from the remainder of the housing 12, and preferably comprises a door for selectively providing access to the microwave cavity 14. Disposed within one of the sidewalls 26 (other than for the door) are a plurality of apertures 28 which collectively define an inlet port fluidly communicating with the microwave cavity 14. As an alternative to including the apertures 28 within one of the sidewalls 26, a sheet of metal mesh may be incorporated into the sidewall 26 for defining the inlet port. Additionally, disposed within the top wall 22 of the housing 12 is an exhaust port 30 which also fluidly communicates with the microwave cavity 14. The inlet port (i.e., apertures 28) and exhaust port 30 are used to facilitate the circulation of a fluid (e.g., air) through the microwave cavity 14 for purposes of cooling the lamps 16 therein. The apertures 28 (inlet port) and the exhaust port 30 are each preferably covered by a sheet 32 of metal mesh to prevent the escape of microwaves from within the microwave cavity 14. Cooling air is circulated through the apertures 28 and exhaust port 30 via an electrically powered cooling fan (not shown).

In the first embodiment, the top, bottom and sidewalls 22, 24, 26 of the housing 12 are each preferably fabricated from a sheet metal material formed of steel, stainless steel, aluminum, tungsten, or nickel. As shown in FIG. 1, the generator 18 is attached to one of the sidewalls 26 of the housing 12, and communicates directly with the microwave cavity 14. However, though not shown, the generator 18 may communicate with the microwave cavity 14 via a waveguide. The microwave cavity 14 of the apparatus 10 has a maximum cross-sectional dimension d which is greater than $\lambda/2$ for allowing microwaves to enter therein either directly from the generator 18 or from a waveguide.

Figure 7:
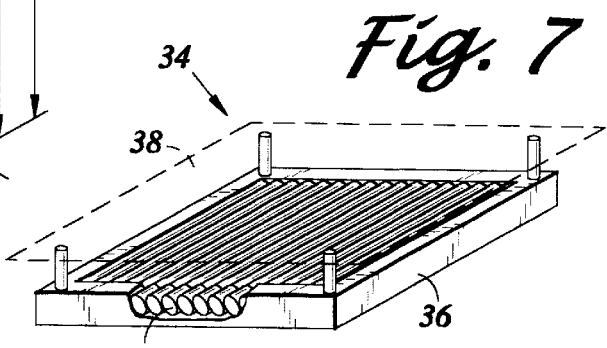
FIG. 7 is a perspective view of a light panel which is included in the embodiments of the radiation generating apparatuses shown in FIGS. 1–6.

Referring now to FIGS. 1 and 7, the light producing lamps 16 of the apparatus 10 are preferably included in a light panel 34 which is disposed within the microwave cavity 14. The light panel 34 comprises a peripheral frame member 36 which defines at least one pair of opposed sides and is preferably fabricated from a material such as metal, ceramic, or plastic. The lamps 16 are arranged within the frame member 36 so as to extend between the opposed sides thereof in substantially parallel relation to each other. Attached to the frame member 36 in spaced relation to the lamps 16 is a reflector member 38 which may be fabricated from a metal material such as stainless steel or aluminum, or may alternatively be fabricated from a dielectric material such as dichroic glass or glass with a dichroic coating.

As best seen in FIG. 1, the light panel 34 is oriented within the microwave cavity 14 so as to extend in generally parallel relation to the top and bottom walls 22, 24 of the housing 12. Importantly, the reflector member 38 of the light panel 34 is sized relative to the microwave cavity 14 such that the distance d1 separating the peripheral edge of the reflector member 38 from the sidewalls 26 of the housing 12 is greater than or equal to $\frac{1}{8}\lambda$. Such sizing allows the microwaves entering the microwave cavity 14 to reach and therefore energize the lamps 16 within the light panel 34. When the lamps 16 are energized, the reflector member 38 functions to concentrate the output of the lamps 16 in a common direction. In the apparatus 10 shown in FIG. 1, the reflector member 38 concentrates the light output toward the bottom wall 24 of the housing 12.

In the apparatus 10 shown in FIG. 1, any part or material to be exposed to radiation generated from the light panel 34 is disposed within the microwave cavity 14 between the light panel 34 and bottom wall 24 of the housing 12. As will be recognized, parts or materials inserted into this section of the microwave cavity 14 will be exposed to the microwaves produced by the generator 18. As such, for those parts or materials which are to be inserted into the apparatus 10 and are sensitive to microwaves (e.g., integrated circuits, semiconductor chips, wafers, thin metal masks), such parts or materials are preferably disposed within a parts tray 40 as shown in FIGS. 1 and 11.

Figure 11:
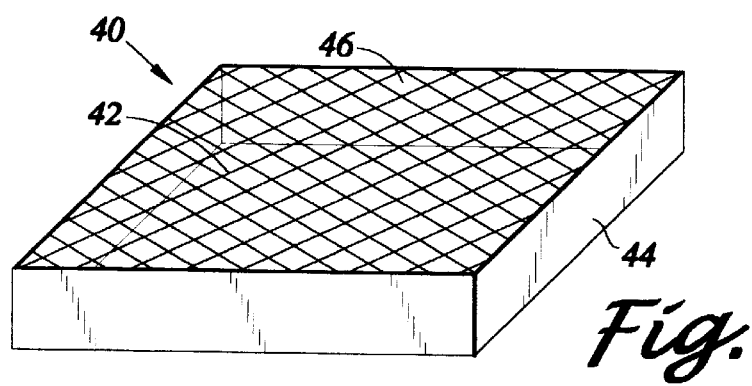
FIG. 11 is a perspective view of a parts tray which may be used in conjunction with the radiation generating apparatus shown in FIG. 1.

As best seen in FIG. 11, the parts tray 40 preferably has a generally square or rectangular configuration, and comprises a metal bottom panel 42 having a metal side panel 44 extending upwardly from the peripheral edge thereof. The side panel 44 may be continuous, or may alternatively comprise four or more separate segments which are attached to each other via welded or soldered connections. Such connections are also preferably used to facilitate the attachment of the side panel 44 to the bottom panel 42. In this respect, it is desirable that the side panel 44 be attached to the bottom panel 42, and that any segments of the side panel 44 be attached to each other in a manner facilitating optimal electrical contact. The parts tray 40 further comprises a sheet 46 of metal mesh which is removably attached to the top rim of the side panel 44. The bottom and side panels 42, 44 and sheet 46 collectively define a holding compartment of the parts tray 40. Though not shown, the parts tray 40 may also have a generally circular configuration.

Importantly, the sheet 46 of metal mesh is transparent to ultraviolet and/or visible light, but does not allow microwaves to pass therethrough. As such, any parts or materials disposed within the holding compartment of the parts tray 40 may be exposed to ultraviolet and/or visible radiation within the apparatus 10, but will not be exposed to microwaves produced by the generator 18.

Figure 10:
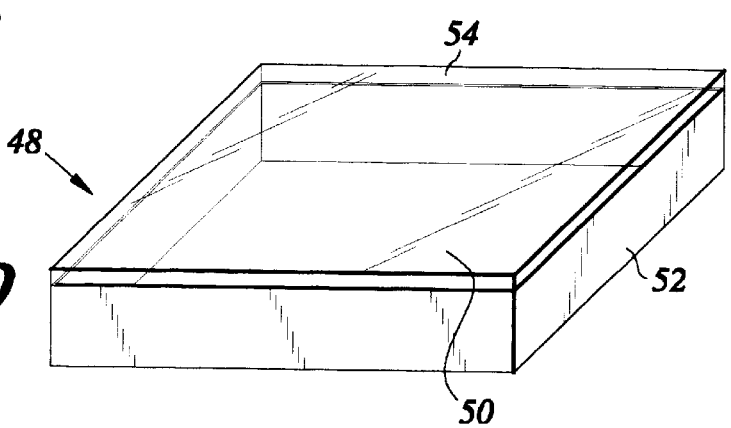
FIG. 10 is a perspective view of a parts tray which may be used in conjunction with the radiation generating apparatus shown in FIG. 1.

Referring now to FIG. 10, it may also be desirable to use the apparatus 10 for purposes of exposing parts and materials emersed in protective gases or liquids to ultraviolet and/or visible light. Such protective gases (e.g., argon, nitrogen, carbon dioxide and other inert gases) or liquids (e.g., water or other UV and/or visible light transparent liquids) are sometimes used for oxygen reduction/inhibition and/or for dust protection. Other special reactive gases are used to facilitate photoinitiated reactions with parts and materials exposed to ultraviolet light. The parts tray 48 shown in FIG. 10 may be used in conjunction with the apparatus 10 as an alternative to the parts tray 40 for these types of applications.

The parts tray 48 comprises a bottom panel 50 which includes a side panel 52 attached to and extending upwardly from the peripheral edge thereof. As in the parts tray 40, the side panel 52 may be continuous, or alternatively comprise separate segments which are attached to each other. Removably attached to the top rim of the side panel 52 is a UV and/or visible light transparent window 54. The bottom and side panels 50, 52 and window 54 collectively define an enclosed interior compartment of the parts tray 48. The bottom and side panels 50, 52 of the parts tray 48 are each preferably fabricated from metal, ceramic, or plastic, with the window 54 preferably being fabricated from sapphire, quartz, glass, or plastic.

Figure 2:
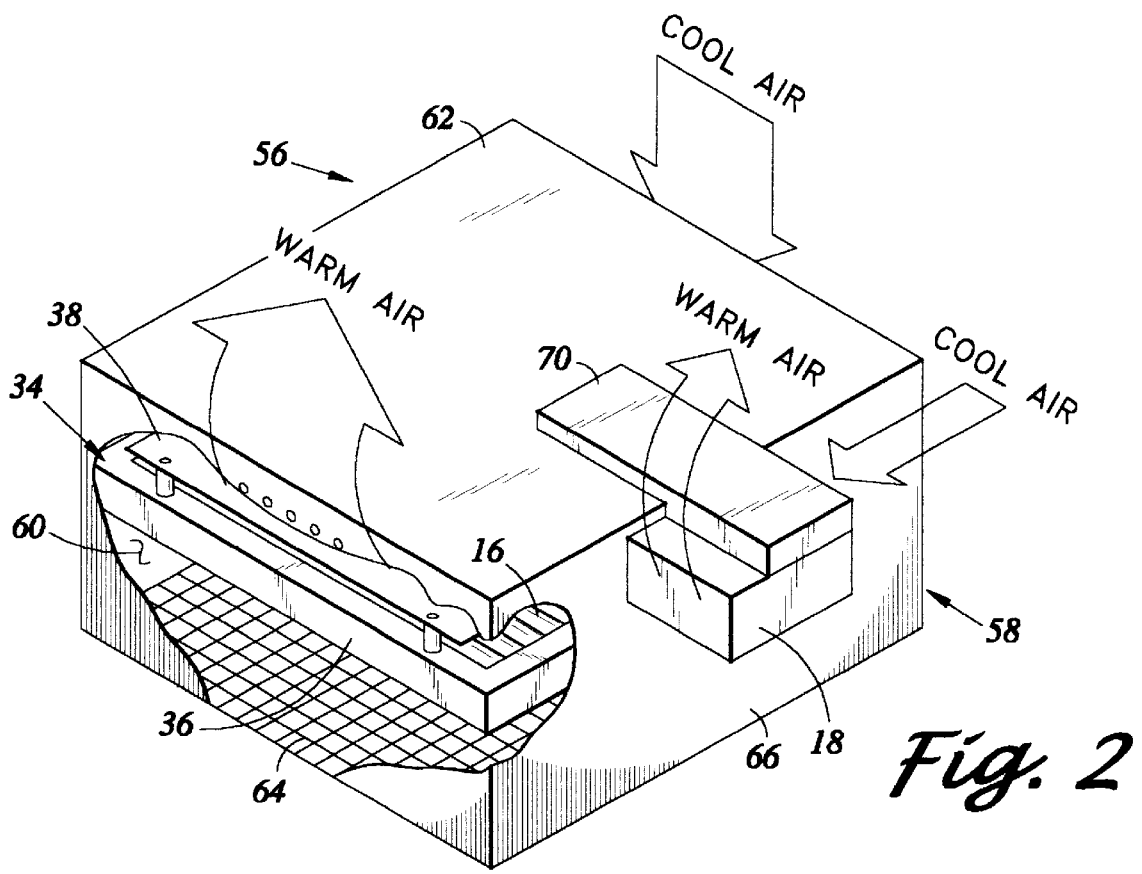
FIG. 2 is a perspective view of a radiation generating apparatus constructed in accordance with a second embodiment of the present invention.

Referring now to FIG. 2, there is depicted an ultraviolet and/or visible radiation generating apparatus 56 constructed in accordance with a second embodiment of the present invention. Similar to the apparatus 10, the apparatus 56 comprises a housing 58 which defines a microwave cavity 60 having a volume Vo. The microwave cavity 60 is itself defined by a top wall 62 of the housing 58, a bottom wall 64 of the housing 58 which is disposed in spaced relation to the top wall 62, and sidewalls 66 of the housing 58 which extend between the top and bottom walls 62, 64. In the apparatus 56, the top and sidewalls 62, 66 are preferably fabricated from any one of the same sheet metal materials used to fabricate the top, bottom and sidewalls 22, 24, 26 of the apparatus 10. However, the bottom wall 64 of the housing 58 is not fabricated from a sheet metal material, but rather comprises a sheet of metal mesh which, as previously explained, does not permit the passage of microwaves therethrough. An opposed pair of the sidewalls 66 of the housing 58 include apertures 68 disposed therein for facilitating the circulation of air therethrough. Such circulation is accomplished through the use of a cooling fan (not shown).

Disposed within the microwave cavity 60 of the housing 58 is the previously described light panel 34 which extends in generally parallel relation to the top and bottom walls 62, 64 and accommodates the number N of light producing lamps 16. Attached to one of the sidewalls 66 of the housing 58 is the microwave magnetron generator 18 which communicates with the microwave cavity 60 via a waveguide 70 extending between the generator 18 and top wall 62 of the housing 58. The optimal operating condition for the apparatus 56 of the second embodiment is governed by the same three formulas previously described in relation to the apparatus 10 of the first embodiment.

Due to the configuration of the apparatus 56, parts or materials to be exposed to ultraviolet and/or visible light are not disposed within the microwave cavity 60, but rather are oriented adjacent or beneath the bottom wall 64 comprising the sheet of metal mesh. As such, parts or materials exposed to ultraviolet and/or visible light from the apparatus 56 will not be exposed to microwaves, since the microwaves are contained within the microwave cavity 60 by the metal mesh bottom wall 64 of the housing 58. The reflector member 38 of the light panel 34 included in the apparatus 56 effectively concentrates the light generated from the lamps 16 toward the bottom wall 64 of the housing 58. Though not shown, the apparatus 56 may be formed with a more elongated configuration than that shown in FIG. 2, thus allowing for the exposure of parts or materials to ultraviolet and/or visible light while traveling slowly on a conveyor located below the metal mesh bottom wall 64. Additionally, the apparatus 56 may be used as a flat panel illuminator for panel displays or ceiling or wall light sources for uniform illumination.

Figure 3:
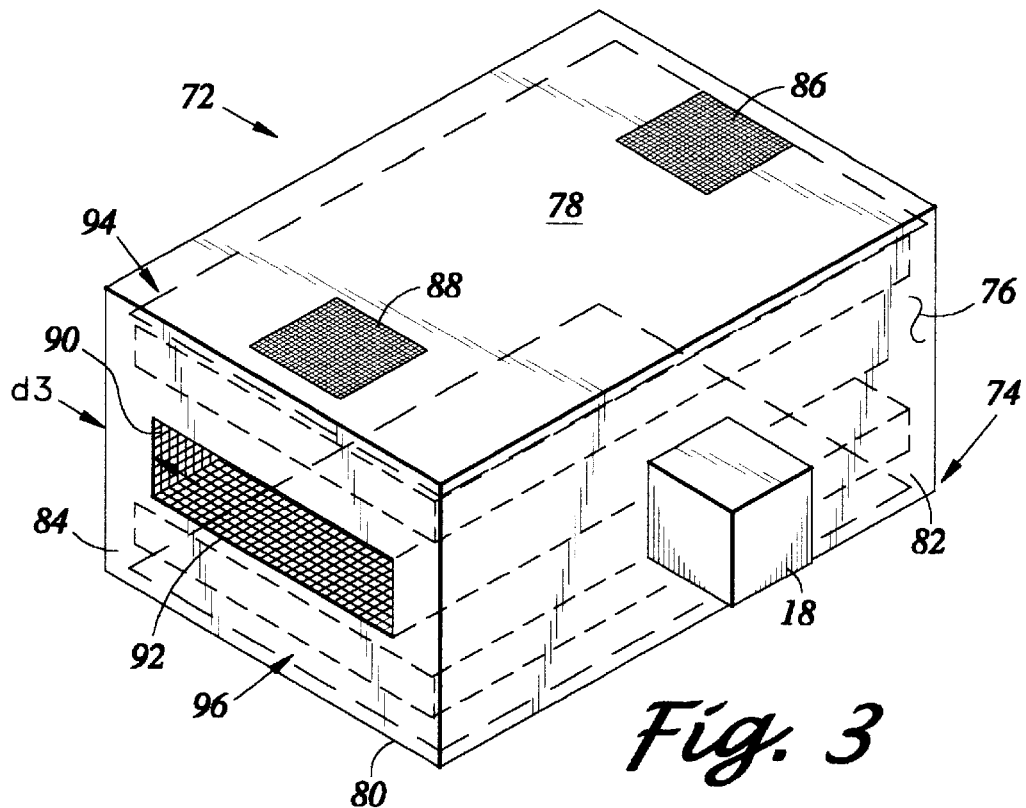
FIG. 3 is a perspective view of a radiation generating apparatus constructed in accordance with a third embodiment of the present invention.

Referring now to FIG. 3, there is depicted an ultraviolet and/or visible radiation generating apparatus 72 constructed in accordance with a third embodiment of the present invention. The apparatus 10 comprises a housing 74 which defines a microwave cavity 76 having a volume Vo. The microwave cavity 76 is defined by a top wall 78 of the housing 74, a bottom wall 80 of the housing 74, an opposed pair of longitudinal sidewalls 82 of the housing 74, and an opposed pair of lateral sidewalls 84 of the housing 74. Attached to one of the longitudinal sidewalls 82 is the microwave magnetron generator 18 which communicates with the microwave cavity 76. The top, bottom, and sidewalls 78, 80, 82, 84 of the housing 74 are each fabricated from any one of the above-described sheet metal materials. Additionally, disposed within the top wall 78 is an inlet port 86 and an exhaust port 88 which are disposed adjacent respective ones of the lateral sidewalls 84. Though not shown, inlet and exhaust ports are also preferably included in the bottom wall 80. The inlet and exhaust ports 86, 88 are used to facilitate the circulation of cooling air through the microwave cavity 76, and are each preferably covered by a sheet of metal mesh for preventing the escape of microwaves from within the microwave cavity 76.

The apparatus 72 is further provided with an elongate channel 90 which extends longitudinally through the microwave cavity 76. The channel 90 is defined by a sheet 92 of metal mesh and includes opposed open ends which communicate with respective ones of the lateral sidewalls 84 of the housing 74. Additionally, the channel 90 is sized relative to the microwave cavity 76 and oriented therewithin such that the distance d3 separating each of the lateral sides of the sheet 92 from the adjacent longitudinal sidewall 82 is greater than or equal to $\frac{1}{8}\lambda$. This particular sizing of the channel 90 relative to the microwave cavity 76 allows microwaves to freely travel in the spaces defined between the longitudinal sides of the sheet 92 and respective ones of the top and bottom walls 78, 80, of the housing 74 for reasons which will be described in more detail below.

In the apparatus 72, the microwave cavity 76 has the number N of lamps 16 disposed therein which are included in a first light panel 94 disposed within the microwave cavity 76 between the channel 90 and the top wall 78, and a second light panel 96 disposed within the microwave cavity 76 between the channel 90 and the bottom wall 80. The first and second light panels 94, 96 are each identically configured to the previously described light panel 34, except that each of the first and second light panels 94, 96 accommodates the number N/2 lamps 16 rather than the number N lamps 16 as in the light panel 34. As seen in FIG. 3, the first light panel 94 extends in generally parallel relation to the top wall 78 and the top longitudinal side of the sheet 92 defining the channel 90, with the reflector member thereof concentrating the output of the lamps 16 toward the channel 90. Similarly, the second light panel 96 extends in generally parallel relation to the bottom wall 80 and the bottom longitudinal side of the sheet 92 defining the channel 90, with the reflector member thereof concentrating the output of the lamps 16 toward the channel 90.

The optimal operating condition for the apparatus 72 constructed in accordance with the third embodiment is governed by the same three formulas described above. As will be recognized, the apparatus 72 is adapted to expose parts or other materials to ultraviolet and/or visible radiation as they travel through the channel 90 via a conveyor or other transport mode. Since the sheet 92 defining the channel 90 is fabricated from metal mesh, those parts or materials traveling through the channel 90 are exposed to ultraviolet and/or visible radiation but are not exposed to microwaves. The previously described distance spacing the lateral sides of the channel 90 from the longitudinal sidewalls 82 allows microwaves to reach the first and second light panels 94, 96 for purposes of energizing the lamps 16 accommodated thereby.

Figure 4:
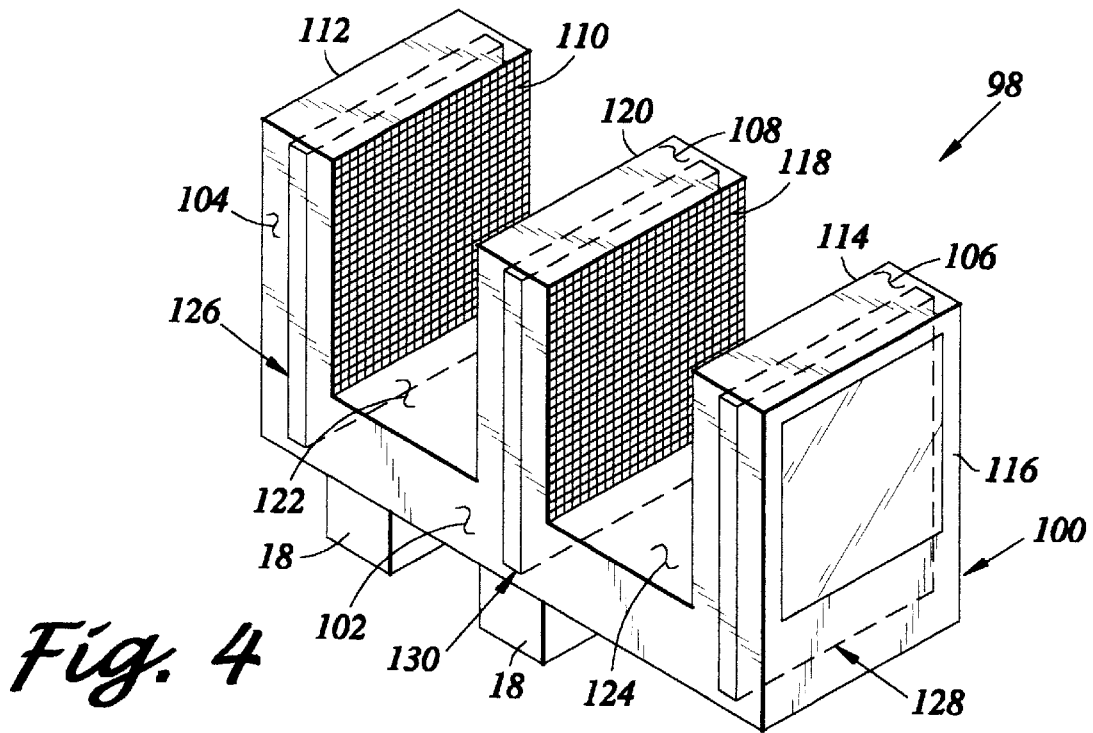
FIG. 4 is perspective view of a radiation generating apparatus constructed in accordance with a fourth embodiment of the present invention.

Referring now to FIG. 4, there is depicted an ultraviolet and/or visible radiation generating apparatus 98 constructed in accordance with a fourth embodiment of the present invention. The apparatus 98 comprises a housing 100 which defines a microwave cavity 102 having a first section 104, a second section 106, and a third section 108. The first section 104 is defined by first inner and outer walls 110, 112 of the housing 100, with the second section 106 being defined by second inner and outer walls 114, 116 of the housing 100. The third section 108 is itself defined by third and fourth inner walls 118, 120 of the housing 100. In the apparatus 98, the first and second outer walls 112, 116 are each fabricated from a solid sheet metal material. The first, second, third and fourth inner walls 110, 114, 118, 120 are each fabricated from a metal mesh material. The first, second and third sections 104, 106, 108 of the microwave cavity 102 are sized to have a combined volume Vo. Additionally, as seen in FIG. 4, the first inner wall 110 and fourth inner wall 120 partially define a first channel 122 of the housing 100, with the second inner wall 114 and third inner wall 118 partially defining a second channel 124 of the housing 100. Attached to the bottom of the housing 100 is the microwave magnetron generator 18 which communicates with the microwave cavity 102.

Disposed within the first section 104 of the microwave cavity 102 is a first light panel 126 which is identically configured to the previously described light panel 34 and accommodates the number ⅓(N) of lamps 16. The first light panel 126 is oriented within the first section 104 such that the reflector member thereof concentrates the output of the lamps 16 toward the first channel 122. Disposed within the second section 106 of the microwave cavity 102 is a second light panel 128 which is also identically configured to the previously described light panel 34 and accommodates the number ⅓(N) of lamps 16. The second light panel 128 is itself oriented within the second section 106 such that the reflector member thereof concentrates the output of the lamps 16 toward the second channel 124. Disposed within the third section 108 of the microwave cavity 102 is a third light panel 130 which itself accommodates the number ⅓(N) of lamps 16. The third light panel 130 is similar to the first and second light panels 126, 128, except that the third light panel 130 does not include a reflector member. As such, the output from the third light panel 130 is generated toward the first and second channels 122, 124 of the housing 100. Each of the first, second and third light panels 126, 128, 130 extends in generally parallel relation to those walls of the housing 100 defining respective ones of the first, second and third sections 104, 106, 108 of the microwave cavity 102.

In the apparatus 98 of the fourth embodiment, the optimal operating condition for each of the first, second and third sections 104, 106, 108 of the microwave cavity 102 is governed by the three formulas described above. In the apparatus 98, parts or materials to be exposed to ultraviolet and/or visible light are passed through one or both of the first and second channels 122, 124 via conveyors or other transport modes. Though being exposed to ultraviolet and/or visible light, such parts or materials are not exposed to microwaves due to the fabrication of the first, second, third and fourth inner walls 110, 114, 118, 120 from metal mesh.

Figure 5:
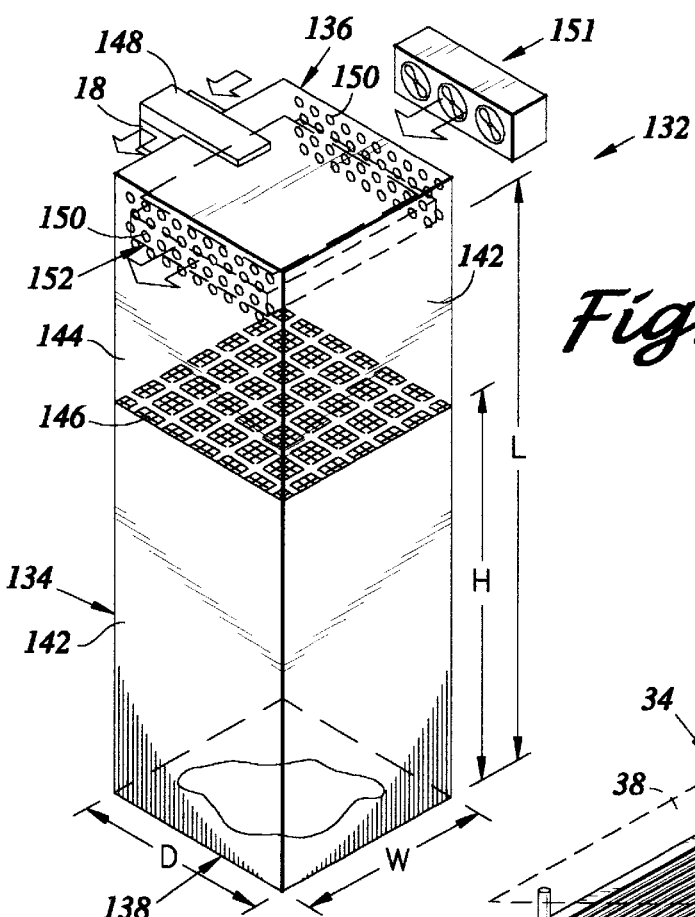
FIG. 5 is a perspective view of a radiation generating apparatus constructed in accordance with a fifth embodiment of the present invention.

Referring now to FIG. 5, there is depicted a ultraviolet and/or visible radiation generating apparatus 132 constructed in accordance with a fifth embodiment of the present invention. The apparatus 132 comprises an elongate housing 134 which includes a top end 136 and a bottom end 138. The housing 134 has a top wall 140 which defines the top end 136, and four sidewalls 142, the bottom edges of which collectively define the bottom end 138. The top wall 140 and sidewalls 142 are also each preferably fabricated from any one of the above-described sheet metal materials. The housing 134 further includes a microwave cavity 144 which has a generally square or rectangular cross-sectional configuration and is defined by the top wall 140, a sheet 146 of metal mesh which is disposed within the interior of the housing 134, and those portions of the sidewalls 142 extending between the top wall 140 and the sheet 146. Attached to a sidewall 142 of the housing 134 and communicating with the microwave cavity 144 via a wave guide 148 which extends along the top wall 140 is the microwave magnetron generator 18. Disposed within an opposed pair of the sidewalls 142, and in particular those portions thereof partially defining the microwave cavity 144, is a plurality of apertures 150 which collectively define separate inlet and exhaust ports. The apertures 150 (i.e., inlet and exhaust ports) are used to facilitate the circulation of cooling air through the microwave cavity 144, with such circulation being created by a cooling fan 151. The apertures 150 are preferably covered by metal mesh material for purposes of preventing the escape of microwaves from within the microwave cavity 144.

Disposed within the microwave cavity 144 in relative close proximity to the top wall 140 of the housing 134 is a light panel 152 which accommodates the number N of lamps 16 and is identically configured to the previously described light panel 34. The light panel 152 is oriented within the microwave cavity 144 so as to extend in generally parallel relation to the top wall 140 and sheet 146, with the reflector member thereof being operable to concentrate the output from the lamps 16 toward the metal mesh sheet 146. The reflector member of the light panel 152 is sized relative to the microwave cavity 144 such that the peripheral edge thereof is spaced the distance d1 from the sidewalls 142 of the housing 134 which is greater than or equal to ⅛λ. Such spacing allows the microwaves entering the microwave cavity 144 from the generator 18 attached to the top wall 140 to reach the light panel 152 and therefore energize the lamps 16 thereof.

In the apparatus 132, the housing has a depth D and a width W. The light panel 152 is preferably spaced from the bottom end 138 of the housing 134 by a distance L, with the sheet 146 of metal mesh having a thickness t and being spaced from the bottom end 138 of the housing 134 by a distance H. The housing is preferably sized such that L≧D, L≧W, and H≧20 (t). The optimal position of a target for uniform exposure to radiation is at the bottom end 138 of the housing 134. Sizing the housing 134 in accordance with the above-described formulas facilitates the uniform distribution of radiation therefrom and protects against the formation of shadows from the metal mesh sheet 146 on any parts which are to be treated with radiation generated from the light producing lamps 16 within the light panel 152. In this respect, the apparatus 132 is preferably used by disposing parts or other materials to be exposed to ultraviolet and/or visible light below the bottom end 138 of the housing 134 within the perimeter of the sidewalls 142 thereof. As such, the apparatus 132 provides for the homogenized distribution of ultraviolet and/or visible light. As will be recognized, the operating condition for the apparatus 132 is governed by the same three formulas described above.

Figure 6:
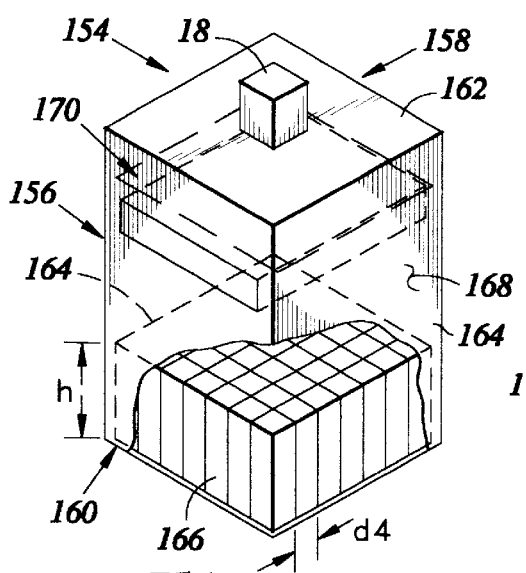
FIG. 6 is a perspective view of a radiation generating apparatus constructed in accordance with a sixth embodiment of the present invention.

Referring now to FIG. 6, there is depicted a ultraviolet and/or visible radiation generating apparatus 154 constructed in accordance with a sixth embodiment of the present invention. The apparatus 154 comprises a housing 156 which includes a top end 158 and a bottom end 160. The housing 156, which has a generally square, rectangular, or hexagonal cross-sectional configuration, includes a top wall 162 which defines the top end 158, and four sidewalls 164, the bottom edges of which collectively define the bottom end 160. The top wall 162 and sidewalls 164 are also each preferably fabricated from any one of the above-described sheet metal materials. Disposed within the interior of the housing 156 are a plurality of light pipes 166, each of which has a generally square, rectangular, or hexagonal cross-sectional configuration. The light pipes 166 are oriented within the housing 156 such that the bottom ends thereof are substantially flush with the bottom end 160. Each of the light pipes 166 is preferably fabricated from a reflective metal material, and has a maximum cross-sectional dimension d4 and a length h, with the light pipes being sized such that d4≦λ/2, and h≧5(d4). The optimal position for a target for uniform exposure to radiation is at a distance of approximately 10(d4) below the bottom end 160 of the housing 156. The housing 156 further includes a microwave cavity 168 which is defined by the top wall 162, the top ends of the light pipes 166, and those portions of the sidewalls 164 which extend between the top wall 162 and the light pipes 166.

Attached to the top wall 162 of the housing 156 is the microwave magnetron generator 18 which communicates with the microwave cavity 168. Additionally, disposed within the microwave cavity 168 in relative close proximity to the top wall 162 is a light panel 170 which is identically configured to the previously described light panel 34 and accommodates the number N of light producing lamps 16. The light panel 170 is oriented within the microwave cavity 168 so as to extend in generally parallel relation to the top wall 162, with the reflector member thereof serving to concentrate the output from the lamps 16 toward the light pipes 166. Additionally, the reflector member of the light panel 170 is sized relative to the microwave cavity 168 such that the distance d1 separating the peripheral edge thereof from the sidewalls 164 is greater than or equal to ⅛λ. Such sizing of the reflector member relative to the microwave cavity 168 allows microwaves entering the microwave cavity 68 from the generator 18 to reach the light panel 170 and therefore energize the lamps 16 thereof. Though not shown, the housing 156 of the apparatus 154 is preferably provided with inlet and exhaust ports similar to those included in the apparatus 132 for purposes of circulating air (via a cooling fan) through the microwave cavity 168 to cool the light panel 170.

The apparatus 154 is similar to the apparatus 132 except that the previously described metal mesh sheet 146 is replaced by the light pipes 166. Sizing the light pipes 166 in the previously described manner causes parts or other materials disposed below the bottom end 160 by the distance 10(d4) and within the perimeter of the sidewalls 164 to be exposed to ultraviolet and/or visible light without any shadows being cast thereupon. As such, the apparatus 154 also provides for the homogenized output of ultraviolet and/or visible light. As will be recognized, the optimal operating condition for the apparatus 154 is also governed by the three formulas described above.

Figure 8:
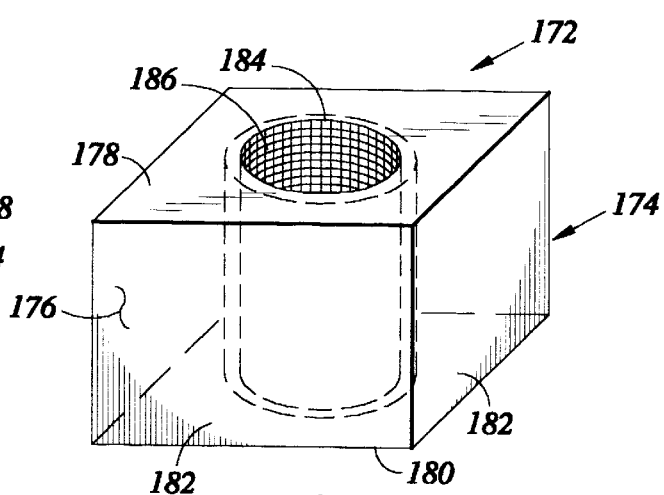
FIG. 8 is a perspective view of a radiation generating apparatus constructed in accordance with a seventh embodiment of the present invention.

Referring now to FIG. 8, there is depicted an ultraviolet and/or visible radiation generating apparatus 172 constructed in accordance with a seventh embodiment of the present invention. The apparatus 172 comprises a housing 174 which defines a microwave cavity 176 having a volume Vo. The microwave cavity 176 is defined by a top wall 178 of the housing 174, a bottom wall 180 of the housing 174, and four sidewalls 182 of the housing 174 which extend between the top and bottom walls 178, 180 thereof. The top wall 178, bottom wall 180 and sidewalls 182 are also each preferably fabricated from any one of the above-described sheet metal materials. The housing 174 preferably has a generally square or rectangular cross-sectional configuration, and includes inlet and exhaust ports (not shown) which are covered by a metal mesh and communicate with the microwave cavity 176 for purposes of circulating cooling air therethrough. As in previous embodiments, such circulation is preferably facilitated through the use of a cooling fan (not shown). Attached to one of the sidewalls 182 of the housing 174 is the microwave magnetron generator 18 which communicates with the microwave cavity 176.

Centrally disposed within the top wall 178 of the housing 174 is a circularly configured opening 184. The apparatus 172 further comprises a cylindrically configured basket 186 which is preferably fabricated from a metal mesh material and includes an open top end and a closed bottom end. The rim of the basket 186 defining the open end thereof is attached to the peripheral edge of the top wall 178 which defines the opening 184. Additionally, the basket 186 is sized relative to the microwave cavity 176 such that the closed bottom end of the basket 186 is spaced from the bottom wall 180 of the housing 174 by a distance d2 which is greater than or equal to ⅛λ.

Figure 9:
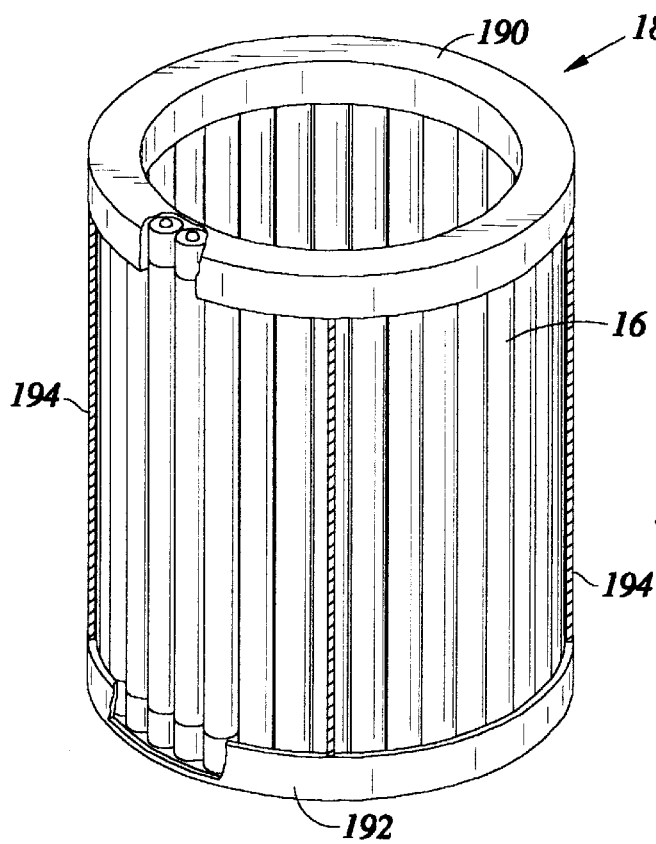
FIG. 9 is perspective view of a light panel which is included in the radiation generating apparatus shown in FIG. 8.

Referring now to FIGS. 8 and 9, the number N of lamps 16 of the apparatus 172 are included in a cylindrically configured light panel 188 which is disposed within the microwave cavity 176 in a manner circumventing the basket 186. The light panel 188 comprises an annular top support ring 190 and an annular bottom support ring 192 which is disposed in spaced relation to and coaxially aligned with the top support ring 190. Extending between and interconnecting the top and bottom support rings 190, 192 are multiple elongate spacer rods 194. The lamps 16 preferably extend linearly between the top and bottom support rings 190, 192 in generally parallel relation to each other, but may alternatively have circular or generally U-shaped configurations. The light panel 188 is preferably supported within the microwave cavity 176 such that the top support ring 190 is substantially flush with the top wall 178. The top and bottom support rings 190, 192 of the light panel 188, as well as the spacer rods 194, are each preferably fabricated from a metal, ceramic, or plastic material. Though not shown, the light panel 188 could include a cylindrically shaped reflector member surrounding the basket 186 for purposes of concentrating the light output of the lamps 16 into the interior of the basket 186.

As will be recognized, parts or materials are exposed to ultraviolet and/or visible light within the apparatus 172 by placing the same within the interior of the basket 186. Additionally, the optimal operating condition for the apparatus 172 is governed by the three formulas described above. By separating the bottom of the basket 186 from the bottom wall 180 in the previously described manner, microwaves are able to freely travel about the light panel 188 to energize the lamps 16 thereof.

The lamps 16 included in the light panels of each of the above-described embodiments of the present invention preferably comprise either ozone producing mercury lamps, ozone-free mercury lamps, black light mercury lamps including an internal phosphorous coating for the emission of different desirable wavelengths, metal halide lamps, excimer lamps, fluorescent lamps, hydrogen lamps, deuterium lamps, low pressure gas filled lamps, or medium pressure gas filled lamps. Each of these lamps may be of the hot cathode, cold cathode, or electrodless variety, and may have a linear, U-shaped, or circular configuration. However, those of ordinary skill in the art will recognize that other types of lamps may be employed in relation to any embodiment of the present invention.

It will be recognized by those of ordinary skill in the art that the ultraviolet and/or visible radiation generating apparatus constructed in accordance with any embodiment of the present invention may include multiple microwave cavities interconnected by one or more waveguides, with each cavity being configured to conform to the above-described optimal operating condition. Any embodiment of the present invention may also include multiple microwave magnetron generators which communicate with one or more microwave cavities.

The various embodiments described above may be used in various applications. Such applications include the illumination of objects such as photosensitive materials, and the ultraviolet-visible curing, solidifying or hardening of polymer coatings and glues. Other applications include stabilizing or etching semi-conductors, wafers or other substrates, sterilizing medical materials and instruments, and large area homogenous light illumination for displays, light emitting panels, and light emitting screens and walls. The various embodiments of the present invention are based on the fundamental principles of simultaneously and uniformly powering by microwave energy highly efficient ultraviolet and/or visible light/radiation producing lamps. Each embodiment of the present invention is economical to manufacture and is adapted to generate ultraviolet, visible light, while being more compact and consuming lower levels of energy than prior art ultraviolet light emitting systems, and eliminating the expensive wiring and ballasts for multi-lamp light emitting systems.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A system for powering at least one lamp using microwaves, comprising:

a housing defining at least one microwave cavity having a volume $V_o$;

a number N of light producing lamps disposed within the microwave cavity, each of said lamps having an inner diameter D, a length L, and a nominal power p; and at least one microwave magnetron generator in communication with the microwave cavity, said generator having a microwave power P and producing microwaves having a wavelength $\lambda$;

the optimal operating condition for the system to maximize the radiation output and longevity of the lamps and minimize system power consumption being governed by the relationships:

$$V_o \geq V\min 1 \text{ wherein } V\min 1 = 8\pi^3/3;$$

$$V_o \geq V\min 2 \text{ wherein } V\min 2 = \pi(D+1)^2 N L/4;$$

and $$P = kNp\sqrt{1 + V_o/V\min}$$

wherein V min is the larger of V min 1 and V min 2, and k is a constant with a value in the range of $0.3 \leq k \leq 3$, and $\pi = 3.14$.

2. The system of claim 1 further comprising a power supply electrically connected to the microwave magnetron generator.

3. The system of claim 1 wherein the lamps are included in a light panel which is disposed within the microwave cavity and comprises:

a peripheral frame member defining at least one pair of opposed sides;

said lamps being arranged within the frame member so as to extend between the opposed sides thereof in substantially parallel relation to each other.

4. The system of claim 3 wherein the frame member is fabricated from a material selected from the group consisting of:

metal;

ceramic; and plastic.

5. The system of claim 3 wherein said light panel further comprises a reflector member attached to the frame member in spaced relation to the lamps for concentrating the radiation output of the lamps in a common direction.

6. The system of claim 5 wherein the reflector member is fabricated from a metal material selected from the group consisting of:

stainless steel; and aluminum.

7. The system of claim 6 wherein the microwave cavity is partially defined by a side wall of the housing and the reflector member defines a peripheral edge which is spaced a distance d1 from the side wall, the reflector member being sized relative to the microwave cavity such that such $d1 \geq \frac{1}{8}\lambda$.

8. The system of claim 5 wherein the reflector member is fabricated from a dielectric material.

9. The system of claim 8 wherein the dielectric material comprises dichroic glass.

10. The system of claim 1 wherein the microwave magnetron generator communicates with the microwave cavity via a wave guide.

11. The system of claim 1 wherein the housing includes an inlet port and an exhaust port which each communicate with the microwave cavity and are used to facilitate the circulation of a fluid therethrough.

12. The system of claim 11 wherein the inlet and exhaust ports are each covered by a sheet of metal mesh to prevent the escape of microwaves from within the microwave cavity.

13. The system of claim 1 wherein the microwave cavity is defined by:

a top wall of the housing;

a bottom wall of the housing disposed in spaced relation to the top wall; and a side wall of the housing extending between the top and bottom walls.

14. The system of claim 13 wherein at least one wall of the housing comprises a sheet of metal mesh.

15. The system of claim 13 wherein the top, bottom and side walls of the housing are each fabricated from a material selected from the group consisting of:
   steel;
   stainless steel;
   aluminum;
   tungsten; and
   nickel.

16. The system of claim 13 wherein the microwave cavity includes a sheet of metal mesh disposed therein which defines a cylindrically configured chamber, and the lamps are included in a cylindrically configured light panel which is disposed within the microwave cavity and comprises:
   an annular top support ring;
   an annular bottom support ring disposed in spaced relation to and coaxially aligned with the top support ring; and
   at least one elongate spacer rod extending between and interconnecting said top and bottom support rings;
   said lamps extending between said top and bottom support rings about said sheet of metal mesh and outside of the chamber defined thereby.

17. The system of claim 16 wherein the lamps extend linearly between the top and bottom support rings in generally parallel relation to each other.

18. The system of claim 16 wherein the light panel is inserted into the microwave cavity via an opening disposed within the top wall of the housing and is supported within the microwave cavity such that the top support ring is substantially flush with the top wall and the bottom support ring is spaced from the bottom wall by a distance d2, the light panel being sized relative to the microwave cavity such that $d2 \geq \frac{1}{8}\lambda$.

19. The system of claim 16 wherein the top and bottom support rings and the at least one spacer rod are each fabricated from a material selected from the group consisting of:
   metal;
   ceramic; and
   plastic.

20. The system of claim 13 wherein the housing further includes and elongate channel which extends through the microwave cavity and has opposed open ends, said channel being defined by a metal mesh.

21. The system of claim 20 wherein the side wall of the housing includes opposed pairs of longitudinal and lateral side wall portions, said channel being spaced from the longitudinal side wall portions by a distance d3 with the open opposed ends thereof communicating with respective ones of the lateral side wall portions, said channel being sized relative to the microwave cavity such that $d3 \geq \frac{1}{8}\lambda$.

22. The system of claim 21 wherein the lamps are included in a first light panel which is disposed within the microwave cavity between the channel and the top wall of the housing, and a second light panel which is disposed within the microwave cavity between the channel and the bottom wall of the housing, the first and second light panels each comprising:
   a peripheral frame member defining at least one pair of opposed sides;
   said lamps being arranged within each of the frame members so as to extend between the opposed sides thereof in substantially parallel relation to each other.

23. The system of claim 22 wherein the first and second light panels each further comprise a reflector member attached to the frame member in spaced relation to the lamps therein for concentrating the radiation output of the lamps toward the channel.

24. The system of claim 1 wherein:
   the microwave cavity includes:
      a first section defined by an outer wall and an inner wall fabricated from a metal mesh;
      a second section defined by an outer wall and an inner wall fabricated from a metal mesh; and
      a third section disposed between the first and second sections and defined by opposed side walls fabricated from a metal mesh;
      said first, second and third sections having a combined volume Vo;
   the housing includes:
      a first channel partially defined by the inner wall of the first section and one side wall of the third section; and
      a second channel partially defined by the inner wall of the second section and one side wall of the third section.

25. The system of claim 24 wherein the lamps are included in:
   a first light panel which is disposed within the first section of the microwave cavity between the inner and outer walls thereof;
   a second light panel which is disposed within the second section of the microwave cavity between the inner and outer walls thereof; and
   a third light panel which is disposed within the third section of the microwave cavity between the opposed side walls thereof;
   said first, second and third light panels each accommodating the number 1/3(N) of lamps and comprising a peripheral frame member defining at least one pair of opposed sides, the lamps being arranged within each of the frame members so as to extend between the opposed sides thereof in substantially parallel relation to each other.

26. The system of claim 25 wherein the first and second light panels each further comprise a reflector member attached to the frame member in spaced relation to the lamps therein for concentrating the radiation output of the lamps toward respective ones of the first and second channels.

27. The system of claim 1 wherein the housing includes top and bottom ends, and the microwave cavity is defined by:
   a top wall of the housing which defines the top end thereof;
   a sheet of metal mesh disposed within the housing; and
   a side wall portion of the housing which extends between the top wall and the sheet of metal mesh.

28. The system of claim 27 wherein the lamps are included in a light panel which is disposed within the microwave cavity and comprises a peripheral frame member defining at least one pair of opposed sides, said lamps being arranged within said frame member so as to extend between the opposed sides thereof in substantially parallel relation to each other.

29. The system of claim 28 wherein said light panel further comprises a reflector member attached to the frame member in spaced relation to the lamps for concentrating the radiation output of the lamps toward the sheet of metal mesh.

30. The system of claim 28 wherein:

the housing has a depth D and a width W;

the light panel is spaced from the bottom end of the housing by a distance L; and the sheet of metal mesh is spaced from the bottom end of the housing by a distance H and has a thickness t;

said housing being sized such that:

L2 D;

L>W; and

H–20(t);

the optimal position of a target for uniform exposure to radiation being at the bottom end of the housing.

31. The system of claim 1 wherein the housing includes top and bottom ends, and the microwave cavity is defined by:

a top wall of the housing which defines the top end thereof;

a plurality of light pipes disposed within the housing; and a side wall portion of the housing which extends between the top wall and the light pipes.

32. The system of claim 31 wherein each of the light pipes has a maximum cross-sectional dimension d4 and a length h, said light pipes being sized such that:

$d4 \leq \lambda/2$; and $h \leq 5(d4)$;

an the optimal position for a target for uniform exposure to radiation being at a distance of approximately 10(d4) below the bottom end of the housing.

33. The system of claim 32 wherein each of the light pipes is fabricated from a reflective metal material.

34. The system of claim 31 wherein the lamps are included in a light panel which is disposed within the microwave cavity and comprises a peripheral frame member defining at least one pair of opposed sides, said lamps being arranged within the frame member so as to extend between the opposed sides thereof in substantially parallel relation to each other.

35. The system of claim 34 wherein said light panel further comprises a reflector member attached to the frame member in spaced relation to the lamps for concentrating the radiation output of the lamps toward the light pipes.

36. The system of claim 1 further in combination with a parts tray insertable into the microwave cavity.

37. The system of claim 36 wherein the parts tray comprises:

a bottom panel;

a side panel extending upwardly from the bottom panel; and a UV transparent window removably attached to the side panel;

said bottom and side panels and said window collectively defining an enclosed interior compartment of the tray.

38. The system of claim 37 wherein the bottom and side panels of the tray are each fabricated from a material selected from the group consisting of:

metal;

ceramic; and plastic.

39. The system of claim 37 wherein the window is fabricated from a material selected from the group consisting of:

sapphire;

quartz;

glass; and plastic.

40. The system of claim 36 wherein the parts tray comprises:

a metal bottom panel;

a metal side panel extending upwardly from the bottom panel; and a sheet of metal mesh attached to the side panel;

said bottom and side panels and said sheet of metal mesh collectively defining a holding compartment of the tray.

41. The system of claim 1 wherein the lamps are selected from the group consisting of:

ozone producing mercury lamps;

ozone free mercury lamps;

black light mercury lamps including an internal phosphorus coating;

metal halide lamps;

excimer lamps;

fluorescent lamps;

hydrogen lamps;

deuterium lamps;

low pressure gas filled lamps; and medium pressure gas filled lamps.

42. The system of claim 41 wherein the lamps are selected from the group consisting of:

cold cathode lamps;

hot cathode lamps; and electrodless lamps.

43. A method of powering at least one lamp, comprising the steps of:

a) providing a housing which defines at least one microwave cavity having a volume Vo;

b) providing a number N of the lamps within the microwave cavity, with each of the lamps having an inner diameter Da length L and a nominal power p;

placing a microwave magnetron generator into communication with the microwave cavity, the generator having a microwave power P and producing microwaves having a wavelength $\lambda$; and maximizing the radiation output and longevity of the lamps and minimizing system power consumption by selecting the dimensions and functional attributes of the microwave cavity, the lamps and the generator in accordance with the relationships:

$Vo \geq V \min 1$ wherein $V \min 1 = 8 \pi \lambda^3/3$;

$Vo \geq V \min 2$ wherein $V \min 2 = \pi(D+1)^2 N L/4$;

and $$P = kNp\sqrt{1 + Vo/Vmin}$$

wherein V min is the larger of V min 1 and V min 2, and k is a constant with a value in the range of $0.3 \leq k \leq 3$, and $\pi = 3.14$.

* * * * *